US012642307B2

(12) United States Patent
Reiner et al.

(10) Patent No.: US 12,642,307 B2
(45) Date of Patent: Jun. 2, 2026

(54) TRACKABLE VAPORIZATION

(71) Applicant: UAVA LLC, Pacific Palisades, CA (US)

(72) Inventors: Emmett Cole Reiner, Boulder, CO (US); Jackson Wootton, Pacific Palisades, CA (US); Lukas Sorensen, Santa Monica, CA (US)

(73) Assignee: UAVA LLC, Pacific Palisades, CA (US)

( * ) Notice: Subject to any disclaimer, the term of this patent is extended or adjusted under 35 U.S.C. 154(b) by 0 days.

(21) Appl. No.: 18/906,995

(22) Filed: Oct. 4, 2024

(65) Prior Publication Data

US 2025/0113874 A1 Apr. 10, 2025

Related U.S. Application Data

(60) Provisional application No. 63/588,718, filed on Oct. 7, 2023.

(51) Int. Cl.

| | |
|---|---|
| ***G08C 17/02*** | (2006.01) |
| ***A24F 40/40*** | (2020.01) |
| ***A24F 40/53*** | (2020.01) |
| ***A24F 40/60*** | (2020.01) |
| ***A24F 40/65*** | (2020.01) |

(52) U.S. Cl.
CPC .............. *A24F 40/65* (2020.01); *A24F 40/40* (2020.01); *A24F 40/53* (2020.01); *A24F 40/60* (2020.01); *G08C 17/02* (2013.01)

(58) Field of Classification Search
CPC .......... A24F 40/65; A24F 40/53; A24F 40/40; A24F 40/60; A24F 40/10; A24F 40/42; A24F 40/50; G08C 17/02
See application file for complete search history.

(56) References Cited

U.S. PATENT DOCUMENTS

| | | | | |
|---|---|---|---|---|
| 9,282,772 | B2 | 3/2016 | Tucker et al. | |
| 11,181,199 | B2 | 11/2021 | Fornarelli | |
| 11,666,086 | B2 * | 6/2023 | Fu | H05B 1/0244 131/329 |
| 2013/0042865 | A1 * | 2/2013 | Monsees | H05B 3/34 128/203.27 |
| 2015/0181945 | A1 * | 7/2015 | Tremblay | A24F 40/65 131/328 |
| 2016/0219938 | A1 * | 8/2016 | Mamoun | G05B 15/02 |
| 2016/0278436 | A1 * | 9/2016 | Verleur | H05B 3/44 |

(Continued)

FOREIGN PATENT DOCUMENTS

| | | | | |
|---|---|---|---|---|
| KR | 101994297 | B1 * | 6/2019 | A24F 47/008 |

*Primary Examiner* — Adnan Aziz
(74) *Attorney, Agent, or Firm* — Cozen O'Connor

(57) ABSTRACT

A vaporizer power assembly includes a cartridge interface, a battery, a radio frequency communication interface, an output, an input and a microcontroller. The microcontroller is configured to transmit power and/or heat from the battery through the cartridge interface in accordance with one or more signals from the input and cause the output of the vaporizer power assembly to emit a presence indication in response to receiving a presence indication request with the radio frequency communication interface. A case housing or partially houses the cartridge interface, the battery, the radio frequency communication interface, the output, the input and the microcontroller.

20 Claims, 5 Drawing Sheets

(56) References Cited

U.S. PATENT DOCUMENTS

2017/0135410 A1* 5/2017 Cameron ................. H05B 3/12
2019/0175846 A1* 6/2019 Terry ....................... A24F 40/46
2019/0274362 A1* 9/2019 Newcomb ............ H05B 1/0227
2019/0364968 A1* 12/2019 Fu ............................. H02J 7/00
2020/0000143 A1* 1/2020 Anderson ............... G06F 21/32
2020/0000146 A1* 1/2020 Anderson ............... A24F 40/90
2020/0029619 A1* 1/2020 Sundberg ................ A24F 40/42
2020/0113244 A1* 4/2020 Novak, III ............... H05B 3/34
2020/0146351 A1* 5/2020 Rogan ...................... A24F 40/42
2020/0146361 A1* 5/2020 Silver .................... G16H 40/67
2020/0288788 A1* 9/2020 Vora ........................ A24F 40/40
2021/0007406 A1* 1/2021 Bessant ................... A24F 40/51
2021/0011446 A1* 1/2021 Anderson ........ G06K 19/06037
2021/0015157 A1* 1/2021 Bleloch ................. A61M 15/06
2021/0112882 A1 4/2021 Hejazi et al.
2021/0153562 A1* 5/2021 Fishwick ................ A24F 40/65
2021/0154420 A1* 5/2021 Jorgensen ............. A61M 15/06
2021/0161213 A1* 6/2021 Woodbine ............... A24F 40/60
2022/0046997 A1* 2/2022 Atkins .................... A24F 40/51
2022/0053836 A1* 2/2022 Cazzoli ................... G06F 21/32
2022/0132937 A1* 5/2022 Grobler ................... A24F 40/53
131/328
2022/0168513 A1 6/2022 Holt et al.
2022/0248759 A1* 8/2022 Bleloch ................. A24F 40/485
2023/0123567 A1* 4/2023 Moloney ................. A24F 40/40
131/329
2023/0148729 A1* 5/2023 Desmarais ............. A45D 27/29
30/541
2023/0276859 A1* 9/2023 Daugherty .............. A24F 15/01
131/329
2023/0389131 A1* 11/2023 Krietzman ........... H05B 1/0225
2024/0196991 A1* 6/2024 Ok .......................... A24F 40/50
2024/0268484 A1* 8/2024 Moloney ................. A24F 40/53
2024/0284981 A1* 8/2024 Carlberg ................. A24F 40/42

* cited by examiner

TRACKABLE VAPORIZATION

CROSS REFERENCE TO RELATED APPLICATIONS

This application claims the priority benefit of U.S. Provisional Application No. 63/588,718 filed 7 Oct. 2023, which is incorporated herein by reference in its entirety.

SUMMARY

The disclosure describes a vaporizer power assembly. The vaporizer power assembly includes a cartridge interface, a battery, a radio frequency communication interface, an output, an input and a microcontroller. The microcontroller is configured to transmit power from the battery through the cartridge interface in accordance with one or more signals from the input and cause the output of the vaporizer power assembly to emit a presence indication in response to receiving a presence indication request with the radio frequency communication interface. A case houses or partially houses the cartridge interface, the battery, the radio frequency communication interface, the output, the input and the microcontroller.

The disclosure also describes a vaporizer power assembly presence indication system. The system includes a cartridge interface, a battery, a radio frequency communication interface, an output, an input, a non-transitory computer-readable storage medium and a microcontroller. The non-transitory computer-readable storage medium stores computer-executable code for power assembly presence indication. The code, when executed, is configured to cause a processor to send a presence indication request to the radio frequency communication interface. The microcontroller is configured to cause the output to emit a presence indication in response to receiving the presence indication request with the radio frequency communication interface.

Further, the disclosure describes a method for indicating presence of a vaporizer power assembly. The method includes receiving a presence indication request by radio frequency communication network and, from the vaporizing device, emitting a presence indication corresponding with the received presence indication request.

BRIEF DESCRIPTION OF THE FIGURES

The summary above, as well as the following detailed description of illustrative embodiments, is better understood when read in conjunction with the appended drawings. For the purpose of illustrating the present disclosure, example constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION

The following detailed description illustrates embodiments of the disclosure and manners by which they can be implemented. Although the best mode of carrying out the present disclosure has been disclosed, those skilled in the art would recognize that other embodiments for carrying out or practicing the present disclosure are also possible.

It should be noted that the terms “first”, “second”, and the like, herein do not denote any order, quantity, or importance, but rather are used to distinguish one element from another. Further, the terms “a” and “an” herein do not denote a limitation of quantity, but rather denote the presence of at least one of the referenced item.

Vaporizers, aerosolizers, aerosol delivery devices and/or atomizers heat solid materials up to a smoldering point, vaporize liquid with heat, or nebulize a liquid by heat and/or by expansion through a nozzle. Aromatic materials released from the heated, smoldering, vaporized and/or nebulized solid or liquid may be inhaled by a user for various therapeutic effects. Vaporizers and/or atomizers are designed to release the aromatic materials while avoiding high temperatures of combustion.

Disclosed embodiments provide power assemblies, presence indication systems suitable for use with vaporizers, aerosolizers, aerosol delivery devices and/or atomizers as well as methods for indicating presence of vaporizer, aerosolizer, aerosol delivery device and/or atomizer power assemblies.

Embodiments of the present disclosure substantially eliminate, or at least partially address, problems in the prior art, enabling users to locate or track misplaced vaporizers, aerosolizers, aerosol delivery devices and/or atomizers and other articles. Additional aspects, advantages, features and objects of the present disclosure will be made apparent from the drawings and the detailed description of the illustrative embodiments construed in conjunction with the appended claims that follow. It will be appreciated that features of the present disclosure are susceptible to being combined in various combinations without departing from the scope of the present disclosure as defined by the appended claims.

Figure 1:
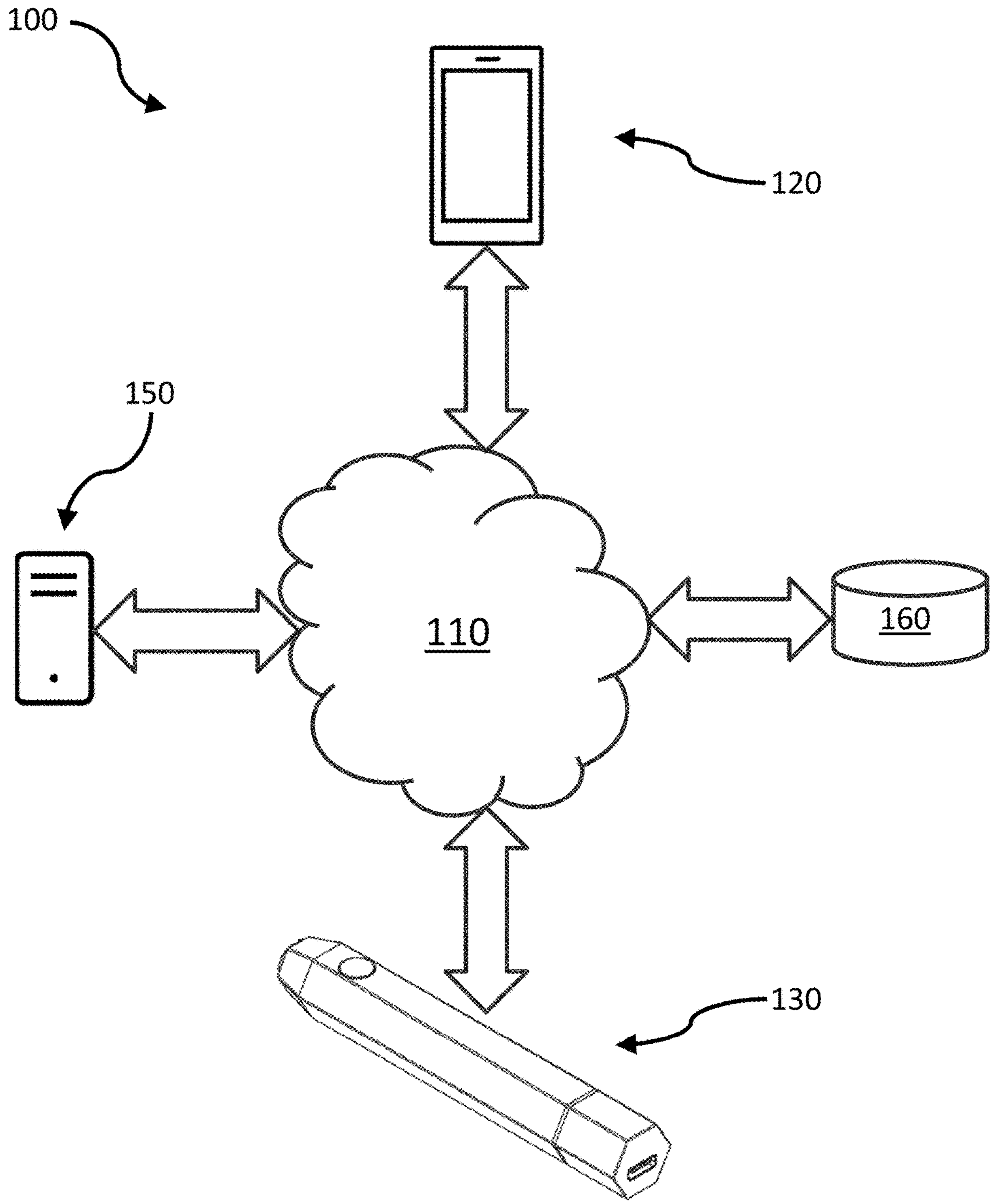
FIG. 1 schematically illustrates an example network environment suitable for use in association with disclosed methods, systems and assemblies.

FIG. 1 schematically illustrates an example network environment 100 suitable for use in association with disclosed methods, systems and assemblies. Network environment 100 includes one or more data processing units, depicted as a data processing unit 120 and a data processing unit 130, a server 150, a database 160 associated with server 150 and a communication network 110.

Network environment 100 may be implemented in various ways, depending on various possible scenarios. In one example scenario, network environment 100 may be implemented by way of a spatially distributed arrangement of data processing unit 120 and data processing unit 130 coupled mutually in communication via communication network 110. In a further example scenario, network environment 100 may be implemented by way of a spatially collocated arrangement of server 150 and database 160. In another example scenario, network environment 100 may be implemented by way of a spatially distributed arrangement of server 150 and database 160 coupled mutually in communication via communication network 110. In yet another example scenario, server 150 and database 160 may be implemented via cloud computing services.

Data processing units 120 and 130 may be coupled in communication with one another via communication network 110. Further, in an example, data processing unit 120 and server 150 may be coupled in communication with one another via communication network 110 while data processing unit 130 is not coupled in communication with server 150 or database 160.

Communication network 110 can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks, Worldwide Interoperability for Microwave Access (WiMAX) networks, Bluetooth communications networks, near field communication (NFC) networks and/or other radio frequency communications networks. Given members of the environment may be coupled in communication with one another via select individual networks and/or according to select protocols. For example, data processing unit 120 and data processing unit 130 may be coupled in communication with one another exclusively via one of Bluetooth or NFC.

Example data processing units 120 generally include a computer-readable storage medium such as a memory, a processor such as a CPU, input, output and a radio frequency communication interface and are suitable for executing computer-executable code configured to cause sending of a presence indication request through communication network 110 to a radio frequency communication interface of one or more data processing units 130.

Examples of data processing units 120 include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, desktop computers, Network-Attached Storage (NAS) devices, large-sized touch screens with embedded PCs, and interactive entertainment devices, such as game consoles, Television (TV) sets and Set-Top Boxes (STBs). Examples of data processing units 130 include, but are not limited to, vaporizer power assemblies, aerosolizer power assemblies, aerosol delivery device power assemblies and/or atomizer power assemblies such as those described in further detail below.

Network environment 100 is suitable for implementing power assembly presence indication systems. In order to implement a power assembly presence indication system, data processing units 120 and 130 communicate by connection through communication network 110. Optionally, data processing units 120 may access server 150 to download one or more software products associated with a power assembly presence indication service. Database 160 may store the one or more software products and or data related to the software products and/or associated services. Alternatively, such software products are provided to a user associated with data processing unit 120 on a type of physical computer-readable media such as a disc or drive.

In an embodiment, environment 100 may be arranged in a manner such that its functionality is implemented substantially in data processing units 120 by way of the software products. In such an arrangement, data processing units 120 may be coupled to server 150 periodically or randomly from time to time, for example, to receive updates from the server and/or to upload status to the server.

Environment 100 may also be arranged in a manner such that its functionality is implemented partly in data processing units 130 through communication with data processing unit 120 using communication network 110 or one or more individual networks thereof.

Users associated with data processing units 120 and 130 use the power assembly presence indication service. Often, both data processing units 120 and data processing units 130 will be used, operated, held and/or carried by a single user. In an embodiment, data processing unit 120 substantially continuously records and updates changes in the status of data processing unit 130.

Disclosed power assembly presence indication services can be offered free of cost. Alternatively, the power assembly presence indication services can be a paid service that has a subscription-based billing or a transaction-based billing, such as pay-per-use and pay-per-feature. In yet another example, the service may be offered in exchange for a user purchasing a product such as disclosed power assemblies and/or atomizer power assemblies or in exchange for a one-time purchase of software suitable for supporting the service.

Software suitable for use with data processing unit 120 and/or data processing unit 130 to support disclosed power assembly presence indication services may be created using any of a variety of programming languages and/or development environments. Example programming languages include but are not limited to C, C++, C#, Objective-C, Java™, Javascript, Pascal, Object Pascal, Python™, Ruby, VB.NET, WML, and XHTML/HTML with or without CSS and combinations of these.

FIG. 1 is merely an example, which should not unduly limit the scope of the claims herein. It is to be understood that the specific designation for network environment 100 is provided as an example and is not to be construed as limiting network environment 100 to specific numbers, types, or arrangements of data processing units, servers, databases and communication networks. A person skilled in the art will recognize many variations, alternatives, and modifications of embodiments of the present disclosure.

Figure 2:
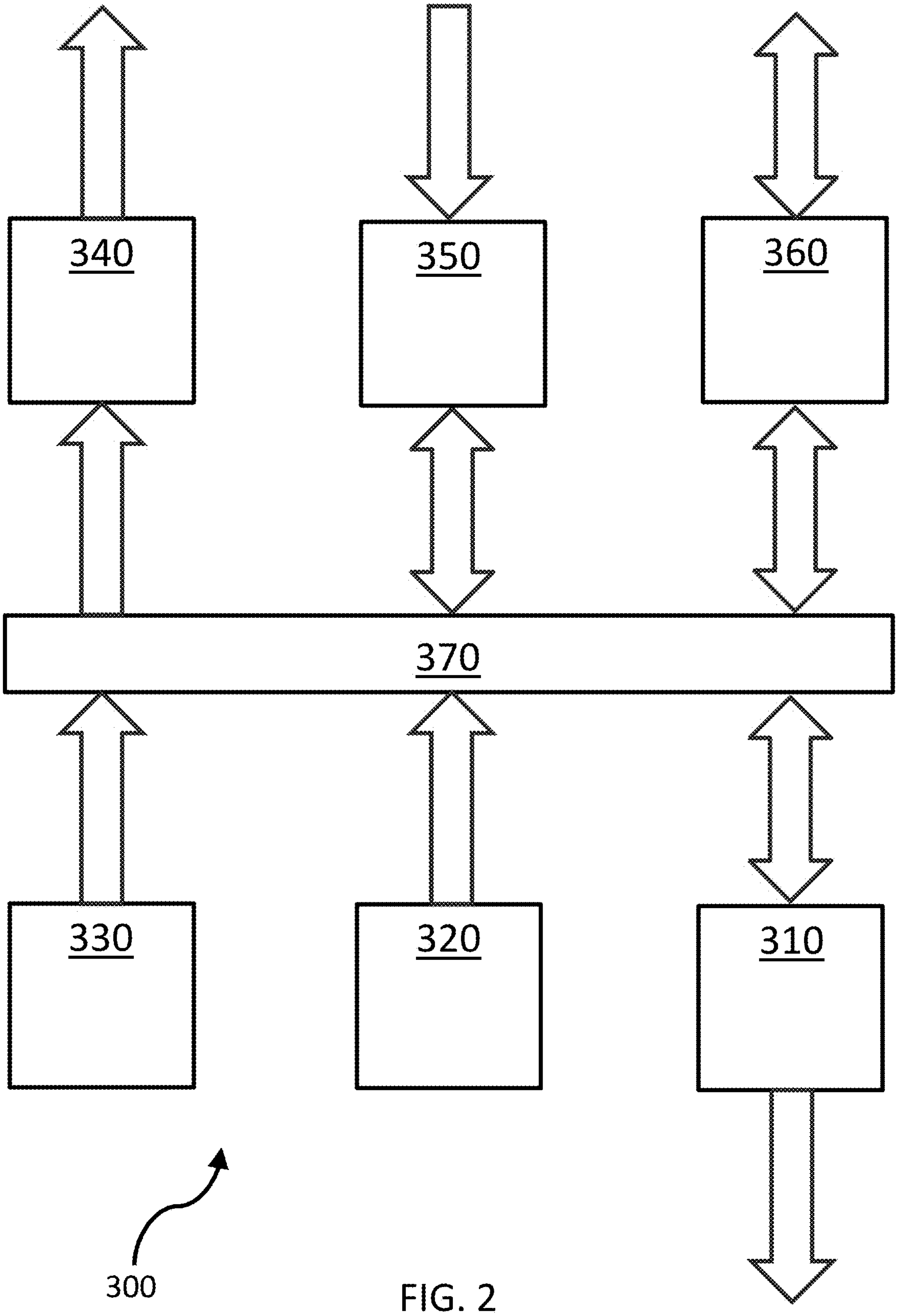
FIG. 2 schematically illustrates an example vaporizer power assembly suitable for use in association with disclosed methods, systems, assemblies and the example network environment of FIG. 1.

FIG. 2 is a schematic illustration of various components of an example power assembly 300 in accordance with an embodiment of the present disclosure and suitable for use in association with any of a variety of aporizers, aerosolizers, aerosol delivery devices and/or atomizers. Hereinafter referred to as vaporizer power assembly, power assembly 300 could be implemented as data processing unit 130 of FIG. 1 and vice versa.

Vaporizer power assembly 300 includes, but is not limited to processing or controlling hardware such as a microcontroller 320, a electromechanical interface 310, a radio frequency interface 360, an input 350, output devices 340, a battery 330 and a system bus 370 that operatively couples various components including microcontroller 320, electromechanical interface 310, radio frequency interface 360, input 350, output devices 340 and, in some scenarios, battery 330. In other scenarios, battery 330 may power components such as microcontroller 320, electromechanical interface 310, radio frequency interface 360, input 350 and output devices 340 through a separate power bus (not shown).

Output devices 340 may include but are not limited to speakers, vibrators, lights such as LEDs and combinations of these.

Battery 330 may, for example, include a rechargeable battery. In a further example, battery 330 may be a 500 mAh, rechargeable battery having a standby power consumption of <50 μA and suitable for recharging by a USB-C connection port at a current of 800 mA. In an example, battery 330 is manufactured from lithium or nickel hydride.

Microcontroller 320 optionally includes non-removable memory, such as Random-Access Memory (RAM), Read-Only Memory (ROM), flash memory, or a hard drive. The memory may store instructions enabling microcontroller 320 to interact with other components of vaporizer power assembly 300. Executing the instructions results in interpretation of various commands from the inputs and production of various outputs.

Input 350 may include one or more connection pins of microcontroller 320. Additionally or alternatively, input 350 may include a button that is operable to receive inputs corresponding to clicking or depressing thereof.

Furthermore, radio frequency communication interface 360 is configured to receive communications from and send communications to any of a variety of other members of network environment 100 or other devices including but not limited data processing unit 120 such as implemented in a user mobile device.

When executed on microcontroller 320, stored instructions are configured to cause the microcontroller to transmit power and/or heat from the battery through electromechanical interface 310 in accordance with one or more signals from input 350.

Further, when executed on microcontroller 320, the instructions may be configured to cause the microcontroller to emit, send or broadcast a pairing advertisement from the radio frequency communication r in response to one or more signals from input 350.

Further still, when executed on microcontroller 320, the instructions are configured to cause the microcontroller to emit a presence indication from output devices 340 in response to receiving a presence indication request with radio frequency communication interface 360. The presence indication may be emitted as audio, light, vibration or a combination of these.

Still further, when executed on microcontroller 320, the instructions may be configured to cause the microcontroller to interrupt or prevent power and/or heat transmission through electromechanical interface 310 in the absence of an authorized user condition or in the presence of an unauthorized user condition.

Disclosed computer readable instructions suitable for use in association with vaporizer power assembly 300 may be implemented as hardware, software, firmware, or various combinations of hardware, software, and firmware. The implementation is a matter of choice dependent on performance requirements of the vaporizer power assembly 300.

FIG. 2 is merely an example, which should not unduly limit the scope of the claims herein. It is to be understood that the specific designation for microcontroller 320 is provided as an example and is not to be construed as limiting the microcontroller to specific numbers, types, or arrangements of modules and/or components of the microcontroller. A person skilled in the art will recognize many variations, alternatives, and modifications of embodiments of the present disclosure.

Figure 3:
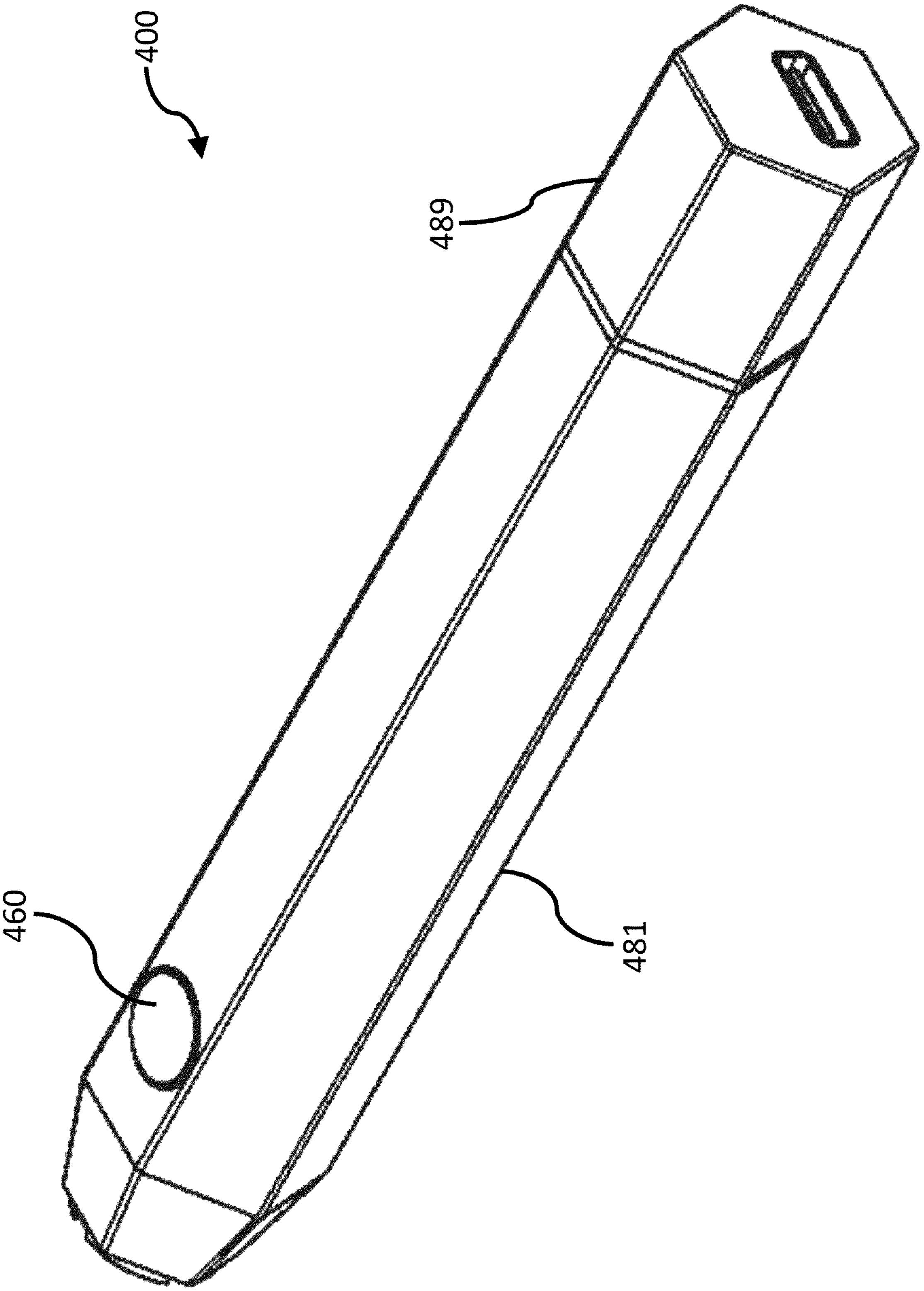
FIG. 3 illustrates a perspective view of an example vaporizer power assembly.
Figure 4:
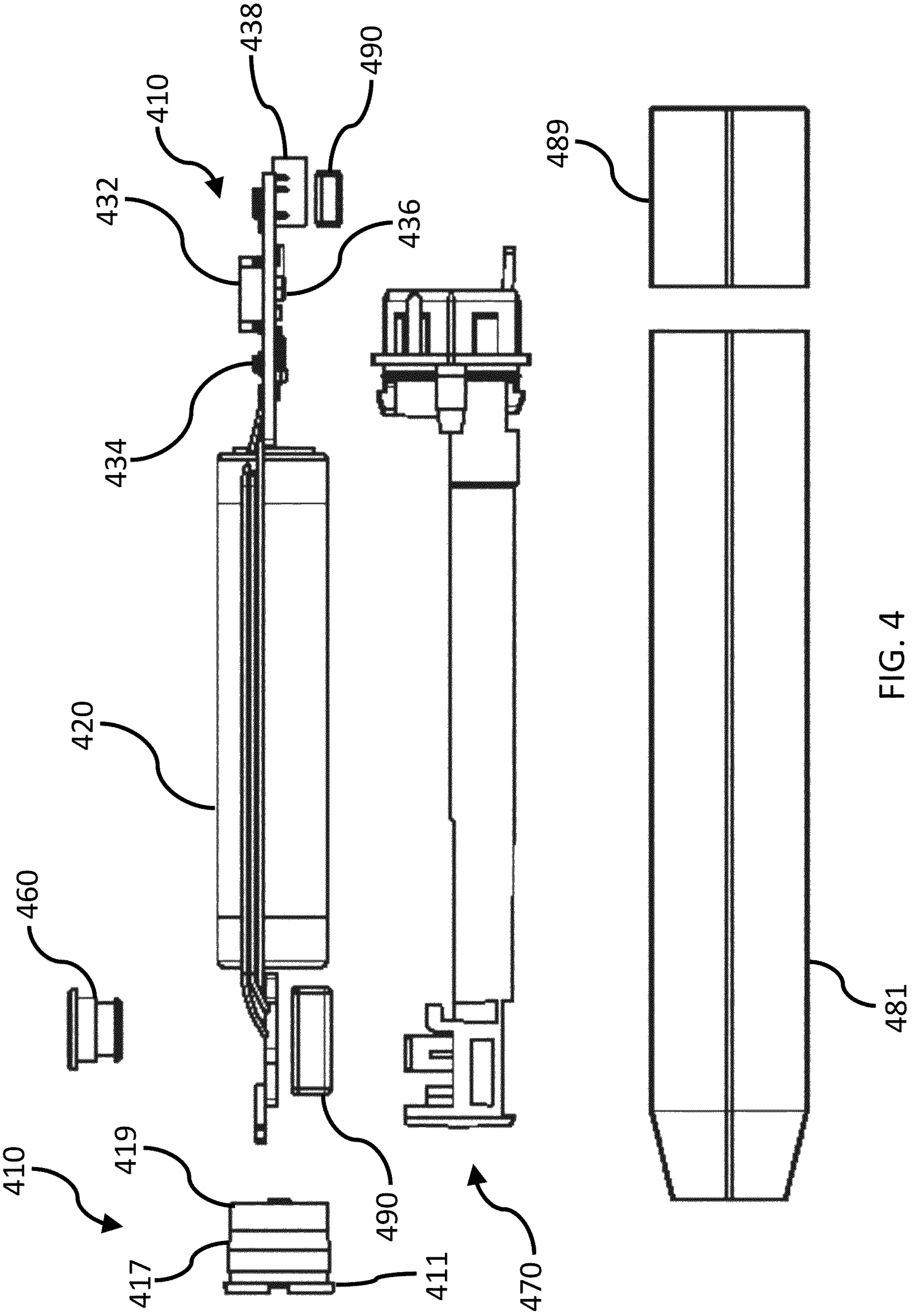
FIG. 4 illustrates an exploded view of the example vaporizer power assembly of FIG. 3.

FIGS. 3 & 4 illustrate an example atomizer or vaporizer power assembly 400 suitable for use in association with disclosed methods, systems, assemblies and the example network environment of FIG. 1. Vaporizer power assembly 400 could be implemented as vaporizer power assembly 300 and vice versa. Similarly, vaporizer power assembly 400 could be implemented as data processing unit 130 and vice versa.

Vaporizer power assembly 400 includes a cartridge interface 410, a battery 420, a radio frequency communication interface 436, an input 460, an output 434, and a microcontroller 432. Cartridge interface 410, which may be an implementation of electromechanical interface 310, has a first end 411 of a first size and a second end 419 of a second size and a central region 417 between the first and second ends. In an example, cartridge interface 410 provides an internal thread configured to mate with a cartridge configured to contain the liquid or other substance to be heated, smoldered, vaporized, nebulized and/or atomized. In a further example, cartridge interface 410 is designed with a 510-thread coupling. While cartridge interface 410 may be formed from any of a variety of materials suitable for minimizing cross-threading and ensuring a leak-proof fit, in an example, cartridge interface 410 is formed from a metal.

Microcontroller 432, battery 420 and radio frequency communication interface 436 may be supported by and/or mechanically coupled with and/or communicatively coupled with a printed circuit board 430 to form a printed circuit board assembly. In an example, radio frequency communication interface 436 operates according to a Bluetooth frequency and/or protocol and has a range of 10 meters or greater. A connection port 438 may be provided to printed circuit board 430 for recharging of battery 420 and/or for other input to or output from vaporizer power assembly 400. In an example port 438 is a USB-C connection port.

A battery harness 470 is provided to cradle battery 420 within case 481 which houses or partially houses cartridge interface 410, battery 420, radio frequency communication interface 436, output 434, input 460 and microcontroller 432. A number of cables couple battery 420 to various components including printed circuit board 430 and cartridge interface 410.

Case 481 has a second end partially surrounding central region of cartridge interface 410 and having a size smaller than first and second ends 411 and 419. With this configuration, cartridge interface 420 may not be simply and nondestructively withdrawn from case 481. Case 481 may be constructed or otherwise formed from any of a variety of materials that resist flexing under heavy loads including but not limited to various metals such as aluminum or steel. Case 481 may take a form which discourages rolling of the associated vaporizer power assembly. While shown as a hexagonal prism by way of example in FIG. 4, case 481 may take any of a variety of sturdy shapes. A base 489 surrounds a first end of harness 470 and is sealed to a first end of case 481.

Positioning magnets 490 may be provided internal to or partially internal to case 481 to enable mounting of vaporizer power assembly 400 to a metallic surface at a desired orientation. For example, vaporizer power assembly 400 and any cartridge coupled thereto through cartridge interface 410 may be selectively maintained in an upright or vertical orientation. Maintaining the cartridge in an upright or vertical orientation may support efficient and effective vaping.

Input 460 which may take the form of, for example, a button, enables a user to provide various commands to output 434, cartridge interface 410, radio frequency communication interface 436 and/or battery 420 directly and/or indirectly through microcontroller 432. While input 460 may also be considered a power button or a lock button, it may be usable to accomplish any of a variety of tasks with vaporizer power assembly 400.

While microcontroller 432 may be configured and/or programmed to respond to a variety of interactions with input 460, in an example when the input is a button, the microcontroller may be configured to, for example by way of the programmed instructions, interpret a held press of the button as a first of one or more signals, interpret a held press of the button as a first of the one or more signals, interpret a first number of presses of the button within a first duration as a second of the one or more signals, interpret a second number of presses of the button within a second duration as a third of the one or more signals, interpret a third number of presses of the button within a third duration as a third of the one or more signals, interpret a fourth number of presses of the button within a fourth duration as a fourth of one or more signals, and so on. In a further example, three presses of the button within 1.5 seconds are interpreted as a second of the one or more signals, interpret five presses of the button within 2 seconds are interpreted as a third of the one or more signals and interpret seven presses of the button within 3 seconds are interpreted as a third of the one or more signals.

Microcontroller 432 may transmit power and/or heat from battery 420 through cartridge interface 410 in response to the first of the one or more signals from input 460. Microcontroller 432 may switch between power operation modes in response to the second of the one or more signals from input 460. For example, microcontroller 432 may switch between 3.3V, 3.6V and 4.2V operating modes. In an example, vaporizer power assembly 400 has a maximum power output of up to 8 W. Further, microcontroller 432 and may emit or send a pairing advertisement from radio frequency communication interface 436 in response to the third of the one or more signals from input 460.

Output 434 which may take the form of, for example, one or more lights, one or more audio speakers or horns, one or more vibrators, one or more eccentric rotating masses or a combination of these, enables a user to observe various states of and/or receive feedback from vaporizer power assembly 400 and/or battery 420, cartridge interface 410, radio frequency communication interface 436, microcontroller 432 and combinations of these.

Microcontroller 432 may cause output 434 of vaporizer power assembly 400 to emit a presence indication in response to receiving a presence indication request with radio frequency communication interface 436. In an example, the presence indication request is received from a user mobile device which may be implemented as data processing unit 120 and vice versa. Output 434 may emit the presence indication as audio, as light and/or as vibration. In a further example, the audio may be a series of beeps or other tones and the light may be a series of flashes. In another example, the audio and/or vibration may reach 70 dBm. The presence indication may enable a user to locate the vaporizer power assembly, track the vaporizer power assembly and/or track the user's location relative to the vaporizer power assembly. In an example, the vaporizer power assembly may be tracked by echolocation.

Microcontroller 432 may discontinue emission of presence indications after a pre-established duration or in response to one or more signals received through button 460 or through radio frequency communication interface 436.

Further, microcontroller 432 may interrupt or prevent power and/or heat transmission through cartridge interface 410 in the absence of an authorized user condition and/or in the presence of an unauthorized user condition. For example, vaporizer power assembly 400 may require a set-up with some form of user credentials before microcontroller 432 allows power and/or heat transmission through cartridge interface 410. In a further example, the user credentials may be suitable to verify the user's age as with a license or similar identification.

Further, registered users of vaporizer power assembly 400 may be able to use their mobile devices to send a "lock out" signal to microcontroller 432 through radio frequency communication interface 436 to interrupt and/or prevent power and/or heat transmission to cartridge interface 410. Additionally or alternatively, microcontroller 432 may interrupt and/or prevent power and/or heat transmission to cartridge interface 410 when a presence indication has been received through radio frequency communication interface 436 as the user would normally not be in possession of vaporizer power assembly 400 when requesting a presence indication to track or locate the vaporizer power assembly.

Figure 5:
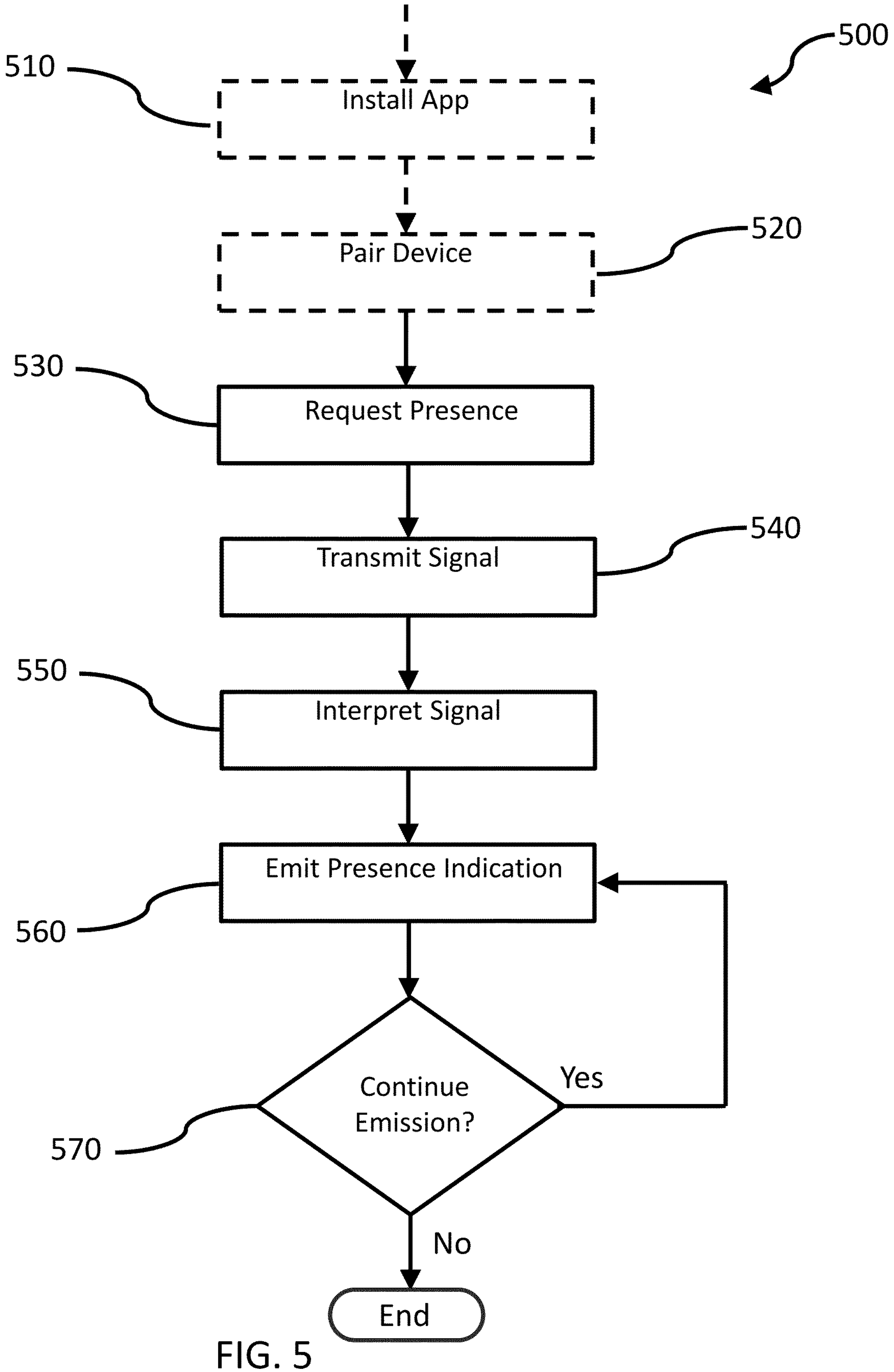
FIG. 5 illustrates an example method of locating a vaporizer power assembly.

Disclosed network environments, data processing units, vaporizer power assemblies and vaporizer power assembly presence indication systems may be suitable for use in association with a variety of methods for locating vaporizer power assemblies, aerosolizer power assemblies, aerosol delivery device power assemblies and/or atomizer power assemblies. FIG. 5 illustrates an example method 500 of locating an example vaporizer power assembly. At 510, a user installs, to their device, an application associated with the vaporizer or atomizer power assembly, vaporizer power assembly presence indication system and/or methods for locating a vaporizer power assembly. At 520, a pairing advertisement is broadcast from a radio frequency communication interface in response to one or more signals from an input and the user pairs a vaporizer power assembly or vaporizer power assembly presence indication system with their own device using, for example, a verification code provided by the pairing advertisement. In an example, a pairing advertising mode may be activated when an input button is depressed seven times within 3 seconds. Actions 510 and 520 may be considered part of an initialization or set-up process which precede further actions of method 500 by an indeterminate duration as needed.

At 530, presence of vaporizer power assembly is requested, for example, by pressing, tapping or clicking on a button or soft button provided to or displayed on a mobile device such as a mobile phone. The button or soft button and the associated pressing, tapping or clicking may be supported by the application installed to the user's device. At 540, the mobile device transmits a signal including the presence request.

At 550, a presence indication request is received by radio frequency communication such as through a radio frequency communication network and, at 560, a presence indication corresponding with the received presence indication request is emitted from the vaporizer power assembly. The presence indication may include emitting audio, emitting light or emitting vibration. The presence indication may enable a user to locate the vaporizer power assembly, track the vaporizer power assembly and/or track the user's location relative to the vaporizer power assembly. In an example, the vaporizer power assembly may be tracked by echolocation.

At 570, it is determined whether emission of the presence indication should be continued. If so, the method will continue emitting a presence indication in accordance with action 560. If not, the method will end until another presence indication is requested per action 530. Whether the presence indication should be continued may be determined by comparison of duration of presence indication with a pre-established time-out duration, by one or more signals from an input of the vaporizer power assembly or a combination of these. For example, the presence indication may be emitted for 15 seconds before timing out when the microprocessor arrests the emission. In another example, the presence indication may be emitted until a user locates the power assembly and actuates the input to send one or more input signals to the microprocessor. The input one or more input signals may be considered a "custody confirmed" indication.

The actions 510-570 are only illustrative and other alternatives can also be provided where one or more actions are added, one or more actions are removed, or one or more actions are provided in a different sequence without departing from the scope of the claims herein.

Disclosed network environments, data processing units, power assemblies and power assembly presence indication systems may be suitable for a variety of methods for use. According to an example method, a button is depressed five times within 2 seconds to switch between a locked state and an unlocked state, the button is depressed three times within 1.5 seconds to switch between three power modes when in the unlocked state and power is continuously supplied through a cartridge interface to a coupled cartridge while the button is held depressed in the unlocked state. Application of power, and thereby heat, to the coupled cartridge causes a liquid within the cartridge to atomize or vaporize. Alternatively and/or additionally, application of power, and thereby heat, to the coupled cartridge causes a solid or other substance within the cartridge to atomize or vaporize.

Power and/or heat transmission through the cartridge interface may be interrupted and/or prevented when the holder of the power assembly is not authorized to use the power assembly and/or power assembly presence indication system. The interruption and/or prevention, in turn, prevents unauthorized vaporization and/or atomization of liquid or other substance in the cartridge using the vaporizer power assembly.

The actions described in association with example methods for using the power assembly and/or power assembly presence indication systems are only illustrative and other alternatives can also be provided where one or more actions are added, one or more actions are removed, or one or more actions are provided in a different sequence without departing from the scope of the claims herein.

Embodiments of the present disclosure are susceptible to being used for various purposes, including, though not limited to, enabling users to users to locate misplaced vaporizers, aerosolizers, aerosol delivery devices and/or atomizers and other articles.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A vaporizer power assembly, comprising:
- a cartridge interface;
- a battery;
- a radio frequency communication interface;
- an output;
- an input;
- a microcontroller configured to:
  - selectively transmit power from the battery through the cartridge interface in accordance with one or more signals from the input,
  - prevent power transmission through the cartridge interface in absence of an authorized user condition that includes user credentials, and
  - cause the output of the vaporizer power assembly to emit a presence indication in response to receiving, via the radio frequency communication interface, a presence indication request to track or locate the vaporizer power assembly,
  - in response to receipt of the presence indication request, interrupt or prevent one or both of power or heat transmission to the cartridge interface; and
- a case at least partially housing the cartridge interface, the battery, the radio frequency communication interface, the output, the input and the microcontroller.

2. The vaporizer power assembly as set forth in claim 1, wherein the microcontroller is further configured to cause the output to emit the presence indication as audio, light, vibration or a combination of these.

3. The vaporizer power assembly as set forth in claim 1, wherein the microcontroller is further configured to emit a pairing advertisement from the radio frequency communication interface in response to one or more signals from the input.

4. The vaporizer power assembly as set forth in claim 3, wherein the input is a button and the one or more signals further comprises seven presses of the button within 3 seconds.

5. The vaporizer power assembly as set forth in claim 1, wherein:
- the cartridge interface has a first end of a first size and a second end of a second size and a central region intermediate the first and second ends; and
- the case has a second end partially surrounding the central region and having a size smaller than the first end first size and the second end second size.

6. The vaporizer power assembly as set forth in claim 1, wherein the input is a button and the microcontroller is configured to:
- interpret a held press of the button as a first of the one or more signals
- interpret a first number of presses of the button within a first duration as a second of the one or more signals
- interpret a second number of presses of the button within a second duration as a third of the one or more signals
- interpret a third number of presses of the button within a third duration as a fourth of the one or more signals.

7. The vaporizer power assembly as set forth in claim 1, further comprising, at least partially housed by the case, a positioning magnet configured for attraction to an external object that enables mounting of the vaporizer power assembly to a metallic surface of the external object at a desired orientation.

8. The vaporizer power assembly as set forth in claim 1, the microcontroller being configured to:
- transmit a custody confirmed indication with the radio frequency communication interface; and
- cause the output to cease emission of the presence indication after the custody confirmed indication.

9. A vaporizer power assembly presence indication system comprising:
- a cartridge interface;
- a battery;
- a radio frequency communication interface;

an output;
an input;
a non-transitory computer-readable storage medium storing computer-executable code for power assembly presence indication, wherein the code, when executed, is configured to cause a processor to send a presence indication request to the radio frequency communication interface; and
a microcontroller configured to:
cause the output to emit the presence indication in response to receiving the presence indication request to track or locate the vaporizer power assembly with the radio frequency communication interface;
in response to receipt of the presence indication request, interrupt or prevent one or both of power or heat transmission to the cartridge interface;
transmit a custody confirmed indication with the radio frequency communication interface; and
cause the output to cease emission of the presence indication after the custody confirmed indication.

10. The vaporizer power assembly presence indication system as set forth in claim 9, wherein the microcontroller is further configured to send a pairing advertisement from the radio frequency communication interface in response to one or more signals from the input.

11. The vaporizer power assembly presence indication system as set forth in claim 9, wherein the input is a button and the microcontroller is further configured to:
interpret a held press of the button as a first of one or more signals;
interpret a first number of presses of the button within a first duration as a second of the one or more signals;
interpret a second number of presses of the button within a second duration as a third of the one or more signals;
interpret a third number of presses of the button within a third duration as a fourth of the one or more signals.

12. The vaporizer power assembly presence indication system as set forth in claim 9, the microcontroller being further configured to prevent interrupt or prevent one or both of power or heat transmission to the cartridge interface in response to receipt of the presence indication request.

13. A method for indicating presence of a vaporizing device, comprising:
with a radio frequency communication interface of the vaporizing device, receiving a presence indication request;
with a microcontroller of the vaporizing device, sending a presence indication command; and
in response to the presence indication command, emitting a presence indication from an output of the vaporizing device;
supplying power from a battery operatively coupled with the vaporizing device through a cartridge interface of the vaporizing device in response to one or more signals from an input to the microcontroller;
preventing power transmission from the battery in absence of an authorized user condition,
emitting a presence indication in response to receiving a presence indication request to track or locate the vaporizing device with the radio frequency communication interface; and
preventing power to the cartridge interface in response to the presence indication request.

14. The method as set forth in claim 13, further comprising emitting a pairing advertisement from the radio frequency communication interface in response to one or more signals from an input to the microcontroller.

15. The method as set forth in claim 13, further comprising activating a pairing advertising mode when a button is depressed seven times within 3 seconds.

16. A vaporizer power assembly, comprising:
a cartridge interface;
a battery;
a radio frequency communication interface;
an output;
an input button;
a microcontroller configured to prevent power transmission from the battery to the cartridge interface when the input button is depressed in the absence of an authorized user condition;
the microcontroller further configured to prevent the power transmission from the battery through the cartridge interface when the vaporizer power assembly is caused to emit a presence indication in response to receiving a presence indication request to track or locate the vaporizer power assembly with the radio frequency communication interface; and
a case at least partially housing the cartridge interface, the battery, the radio frequency communication interface, the output, the input and the microcontroller.

17. The vaporizer power assembly as set forth in claim 16, wherein the microcontroller is further configured to prevent power transmission from the battery through the cartridge interface when the input button is depressed in the presence of an unauthorized user condition.

18. The vaporizer power assembly as set forth in claim 16, wherein the microcontroller is configured to transmit power from the battery through the cartridge interface when the input button is depressed in the presence of an authorized user condition.

19. The vaporizer power assembly as set forth in claim 16, the microcontroller being configured to
transmit a custody confirmed indication with the radio frequency communication interface; and
cause the output to cease emission of the presence indication after the custody confirmed indication.

20. The vaporizer power assembly as set forth in claim 16, further comprising a positioning magnet that enables mounting of the vaporizer power assembly to a metallic surface at a desired orientation.

* * * * *